Dec. 1, 1964                R. E. BRUMBACH                3,159,183
        COMPOSITE TUBING PRODUCT, AND APPARATUS
            AND METHOD FOR MANUFACTURING SAME
Filed July 17, 1961                              6 Sheets-Sheet 1
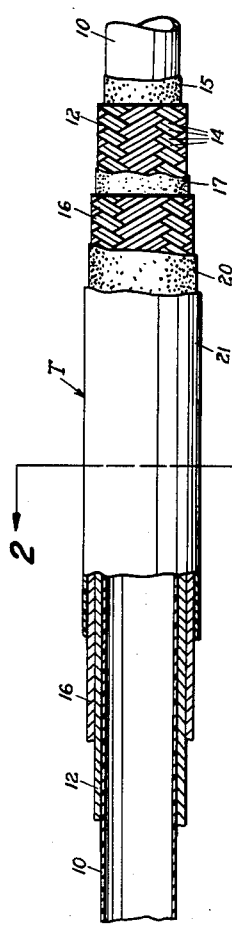
Fig. 1
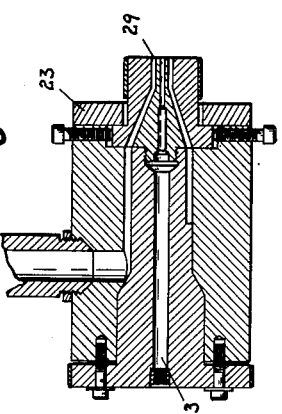
Fig. 3A
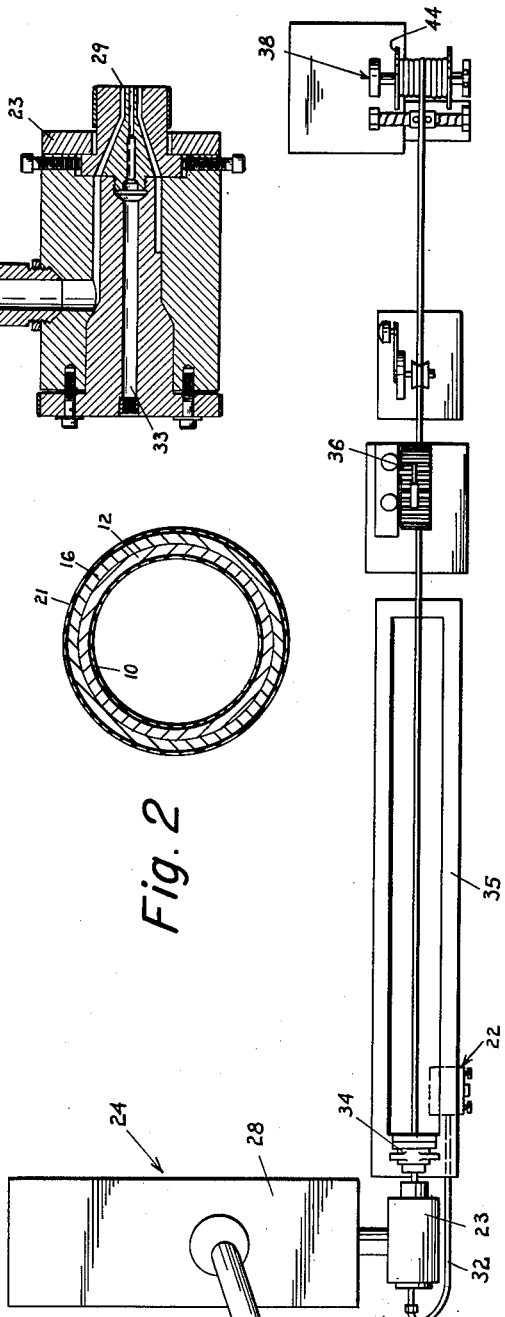
Fig. 2
Fig. 3
INVENTOR.
ROBERT E. BRUMBACH
BY Jeare, Fetzer & Jeare
ATTORNEYS

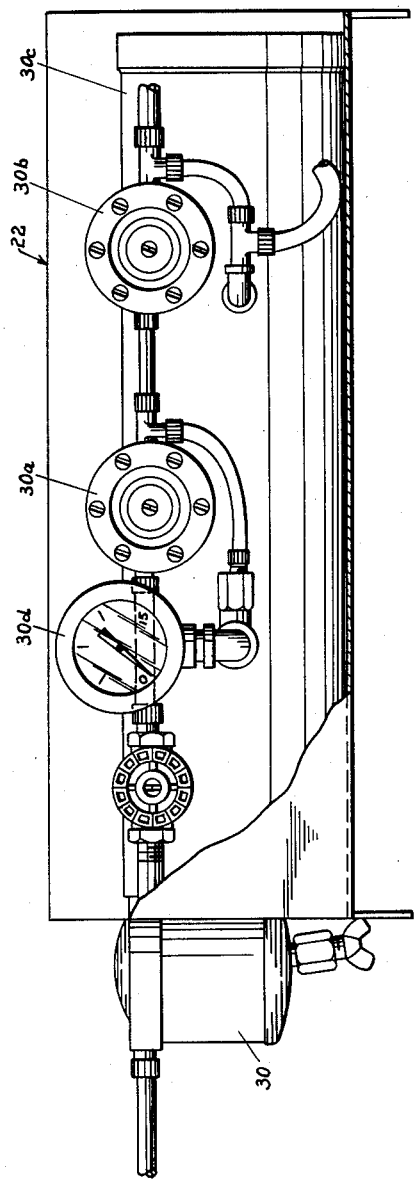
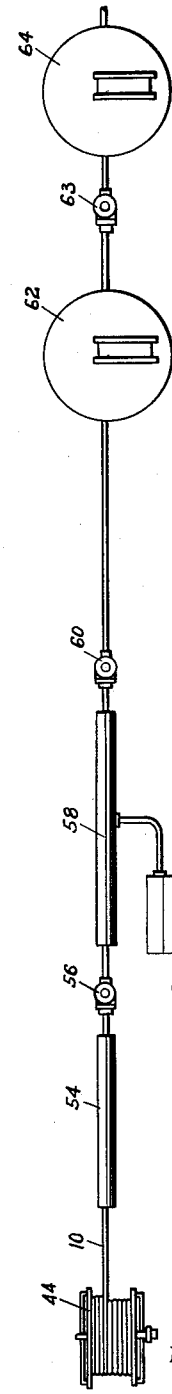
Fig. 5
Fig. 7

Dec. 1, 1964                R. E. BRUMBACH                3,159,183
                COMPOSITE TUBING PRODUCT, AND APPARATUS
                  AND METHOD FOR MANUFACTURING SAME
Filed July 17, 1961                              6 Sheets-Sheet 5

INVENTOR.
ROBERT E. BRUMBACH
BY
ATTORNEYS

INVENTOR.
ROBERT E. BRUMBACH

ATTORNEYS

United States Patent Office 3,159,183
Patented Dec. 1, 1964

3,159,183
COMPOSITE TUBING PRODUCT, AND APPARATUS AND METHOD FOR MANUFACTURING SAME
Robert E. Brumbach, Mantua, Ohio, assignor to Samuel Moore & Company, Mantua, Ohio, a corporation of Ohio
Filed July 17, 1961, Ser. No. 124,448
6 Claims. (Cl. 138—125)

This invention relates in general to composite tubing and associated apparatus and method for manufacturing the same, and more particularly to a reinforced, relatively thin walled composite plastic tubing, possessing high flexibility and crimp resistant characteristics, for the expeditious conveying of pressurized fluid under a wide range of temperature and pressure conditions.

In the pending United States patent application of Robert E. Brumbach, Serial No. 51,837, filed August 25, 1960, now abandoned, there is disclosed a high-strength composite tubing for conveying fluid under relatively high pressures, and comprising an inner tube of nylon, at least one layer of polyester fiber, reinforcing material, such as poly (alkylene terphthalate) ester-fiber, disposed in braided relation about said inner tube, and an outer sheath or layer of polyurethane covering said reinforcing layer, with said outer sheath being secured to said reinforcing material by means of an adhesive bond.

The instant invention provides a high strength, relatively thin walled composite tubing of the general type of the above, having considerably greater flexibility, as well as considerable crimp resistance, resulting in an improved product, especially under a wide range of temperature and pressure conditions, and as compared to composite tubing heretofore known, together with a novel apparatus and method for producing highly flexible composite tubing.

Accordingly, an object of the invention is to provide an improved high-strength composite tubing for conveying fluid under relatively high pressures.

Another object of the invention is to provide a composite tubing of the above type which has considerably increased flexibility, better crimp resistant characteristics under varying temperature and pressure conditions as compared to heretofore known arrangements, and comprising a thin walled inner tube, a layer of polyester fiber reinforcing material disposed in braided relation about said inner tube and bonded thereto by means of an adhesive, and a relatively thin walled sheath of plastic material encompassing said reinforcing material and being bonded thereto.

A still further object of the invention is to provide a composite tubing of the above type comprising a thin walled inner tube of nylon, at least one layer of poly (alkylene terephthalate) ester-fiber reinforcing material disposed in braided relation about said inner tube, and bonded thereto as by means of an adhesive, and a relatively thin walled outer sheath or layer of polyurethane covering said reinforcing layer, with said outer sheath being secured to said reinforcing material by means of an adhesive bond, and resulting in a product having considerable flexibility and good crimp resistance under a wide variety of temperature and pressure conditions.

A still further object of the invention is to provide a novel method of producing the above described composite tubing.

A further object of the invention is to provide a novel apparatus set up for the production of the above-described composite tubing.

Other objects and advantages of the invention will be apparent from the following description taken in conjunction with the accompanying drawings wherein:

FIG. 1 is a partially sectioned, and partially cut away view of a composite tubing product produced in accordance with the instant invention;

FIG. 2 is a transverse cross sectional view taken generally along the plane of line 2—2 of FIG. 1, looking in the direction of the arrow;

FIG. 3 is a more or less diagrammatic top plan view of apparatus disposed in an organized system for producing the inner thin walled tubing of the composite tubing product, together with mechanism for providing internal air pressure support to such inner tubing during its production;

FIG. 3A is a sectional view of the extruder head of the FIG. 3 apparatus;

FIG. 5 is an enlarged, detailed view of the air control unit for controlling the application of internal air pressure to the extruded thin walled tubing;

FIG. 6 is an enlarged, detailed view of a method of folding or crimping one end of the tubing on the receiving reel therefor, for maintaining the internal air support pressure in the tubing;

FIG. 7 is a more or less diagrammatic, top plan view of apparatus disposed in an organized system, for taking the thin walled inner tube, mounted on a reel and applying an adhesive thereto, and then braiding reinforcing material about such inner tube, and thus bond the reinforcing braids to the thin walled inner tube;

Figure 4:
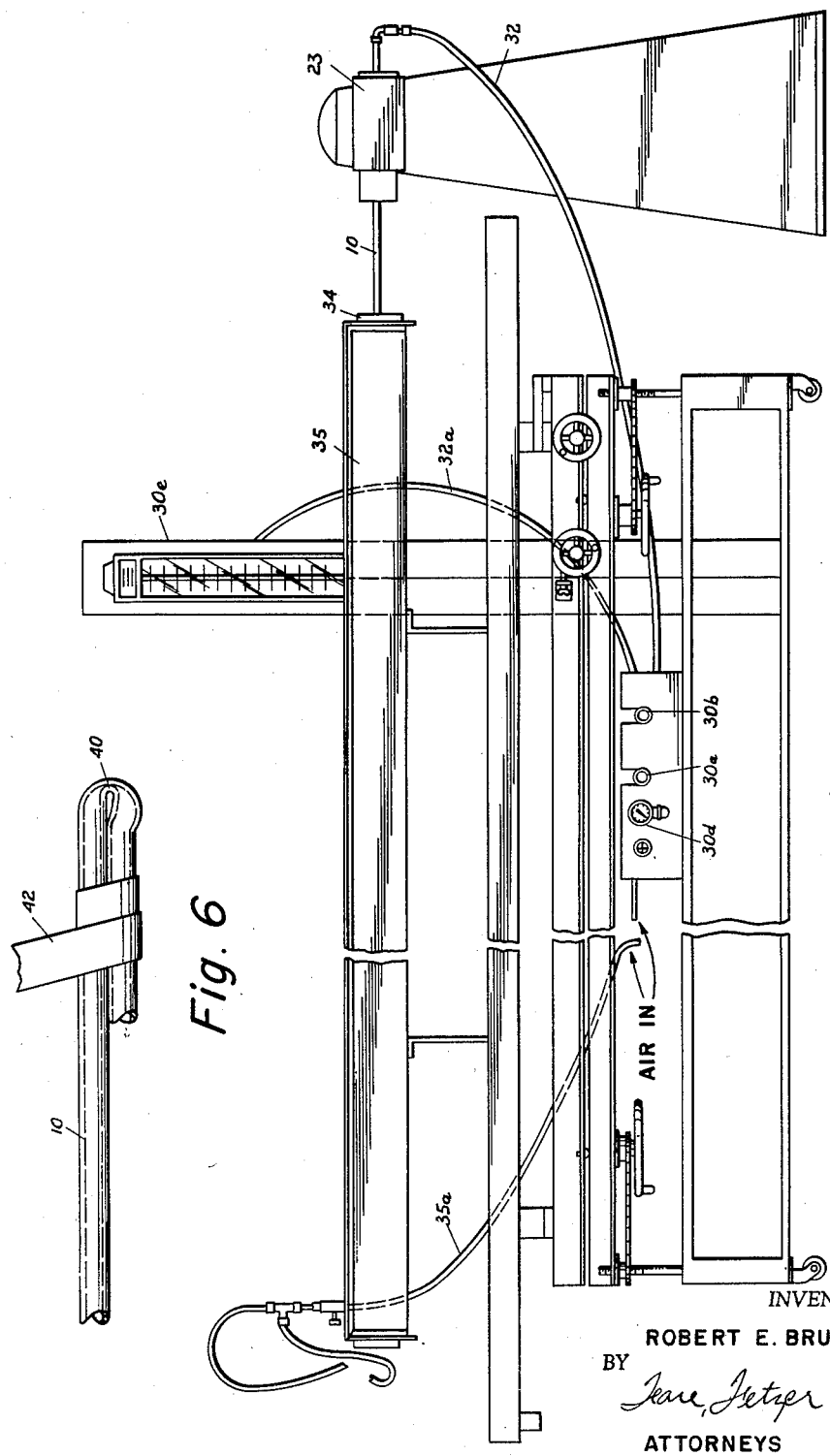
FIG. 4 is an enlarged, detailed, elevational view of the water bath of FIG. 3, for cooling the extruded tubing, and the associated air control unit for providing predetermined internal air support for the tubing.

Referring now again to the drawings and more particularly to FIGS. 1 and 2 thereof, there is shown a piece of composite tubing T comprising a thin walled inner tube or core 10 which may be forced of extruded nylon, such inner tube being adapted to carry the flow of fluid therethrough. Surrounding the inner tube, is a first tubular, braided reinforcing sleeve 12, in which a plurality of strands 14 have been preferably machine braided about the inner tube, using a regular weave, and an adhesive material 15, such as for instance a rubber base solventized adhesive, bonds the reinforcing sleeve 12 to the inner tube 10. Superimposed over the first braided layer may be a second reinforcing tubular braided layer 16, woven in substantially the same manner as the first braided layer.

Layer 12 is preferably bonded to layer 16 by a film 17 of adhesive material of a similar composition to that of film 15. The strand material for the reinforcing members is in each case preferably composed of poly (alkylene terephthalate) ester fiber and more specifically poly (ethylene terephthalate) ester fiber commonly available under the trade name "Dacron." However, other suitable materials might be used, such as, for instance, nylon, or regenerated cellulose or like materials. The strands of braided material are disposed in tensioned relation about the inner tube thereby insuring as little volumetric expansion of the tubing in use as possible, and yet providing for maintaining the flexibility of the same. Reference may be had to the aforementioned United States patent application, Serial No. 51,837 for more detailed teachings of a suitable braiding technique.

The outermost layer of reinforcing material 16 is coated with a layer or film of adhesive 20 and a relatively thin outer sheath 21 of preferably elastomeric-like polyurethane, is extruded over the adhesive coated reinforcing member 16, thus bonding the outer layer or sheath 21 to the braided reinforcing member 16, the latter arrangement providing a high strength tubing product possessing high flexibility and good crimp resistant characteristics.

Now, as a specific example of what is meant by the terminology "thin walled" inner tube, and "thin" outer sheath, the wall thickness of the inner nylon tube may be from 0.010" to 0.025", plus or minus 0.003". A suitable adhesive for bonding the braided layer 12 to inner tube 10, and for bonding braided layers 12 and 16 to one another, is a solventized, rubber based, pressure sensitive adhesive produced by the B. F. Goodrich Company of Akron, Ohio, and known as "Geon A851B." A suitable adhesive for bonding sheath 21 to layer 16 is on produced by the B. F. Goodrich Company and known as "Geon 1056B," which is an isocyanate type of material which cross links and effectively bonds the outer sheath to the braid. The wall thickness of the outer sheath 21 may range from 0.010" to 0.040", plus or minus 0.003".

Referring now to FIG. 3, there is diagrammatically shown apparatus for producing the thin walled inner tube 10. According to the formula $$S = \frac{PD}{2T}$$

which is used for determining tubing strength, and wherein S represents the stress in the tube wall, P represents the internal pressure in the tubing in pounds per square inch, D represents the diameter of the tubing in inches, and T represents the wall thickness of the tube in inches, it will be seen that the internal burst pressure of any tubing is inversely proportional to its diameter. Therefore, the smaller the effective diameter of the reinforcing sleeve or member (e.g. 12, 16) the greater will be the pressure that can be maintained in the tube and still have the stress occasioned in the reinforcing members below the ultimate.

Accordingly, in accordance with this invention, in order to maintain a minimum diameter of reinforcing member, the inner tube 10 of material is made as thin walled as possible, thereby not affecting the interior diameter of the inner tube, which generally is fixed by definition, or to the application to which the product is going to be applied, but by decreasing the outer diameter of the inner tube and thereby decreasing the wall thickness to a minimum, a minimum diameter of reinforcing member or members can be utilized. However, the extrusion of such relatively thin walled inner tube represents many problems, especially as to the supporting of the tubing during its production without collapsing of the walls, and, therefore, in accordance with the instant invention, an air control unit 22 is utilized for maintaining internal air pressure in the tubing 10 as it is extruded from the cross head 23 of extrusion machine 24. The extrusion machine is of more or less conventional type, embodying a hopper 26 and extrusion mechanism 28 which forces the heated plastic material, which in this case is nylon, out of the die orifice 29 of the head 23. The internal air pressure control unit 22 may include an air filter 30, pressure regulators 30a and 30b, a surge tank 30c, and air pressure gauge 30d registering from zero to 15 lbs. of air pressure, and a well-type manometer apparatus 30e. Mechanism 22 is in effect an air control unit with suitable pressure regulators which maintains a constant air pressure inside the tubing 10 being extruded, and this pressure is maintained regardless of the volume inside of the tube. 30a is a coarse regulator valve, while 30b is a fine regulator valve. From the fine regulator valve 30b to the rear of the extrusion head 23 is the main air supply line 32. Teeing off from this line 32 is a spur line 32a going to the manometer 30e. The manometer is used to visually indicate the air pressure being maintained in the extrusion head 23.

Referring now to FIG. 3A, the cross head 23 has a longitudinally extending passageway 33 extending therethrough and providing for communication with the inner tubing 10 as it is extruded from orifice 29.

As the extruded inner tube 10 emerges from the cross head 23 it preferably passes through a vacuum sizing apparatus 34 of well known conventional type for maintaining the proper tube diameter. In apparatus 34, the tubing passes through a sizing die which operates under vacuum and sucks the extruded tubing against a calibrating device which is water cooled. A suitable unit has been found to be that manufactured by Reifenhauser Co. of Troisdorf, Germany. Then the tube passes into a water bath 35 where it is cooled and set. After exiting from bath 35, the water on the tubing may be dried by means of air lines 35a. The tube is taken from the water bath by means of a powered caterpillar type haul-off 36 of well known conventional type, and then it may pass to a coil or reel mechanism 38 where it is wound up in coil form.

As shown in FIG. 6, the end of the tubing when it is initially started onto the reel 44 is pinched or crimped as at 40, and held in such pinched condition as by means of tape 42, for maintaining the internal air pressure support to the tubing.

The following are specific examples of pressures utilized to support the inner tube during production thereof in the apparatus of FIG. 3:

On ⅜" I.D. tubing—1.95" to 2.1" of water air pressure as measured by manometer 30e;
On ½" I.D. tubing—2.2" to 3.2" of water air pressure;
On ¾" I.D. tubing—2.2" of water air pressure.

Figure 8:
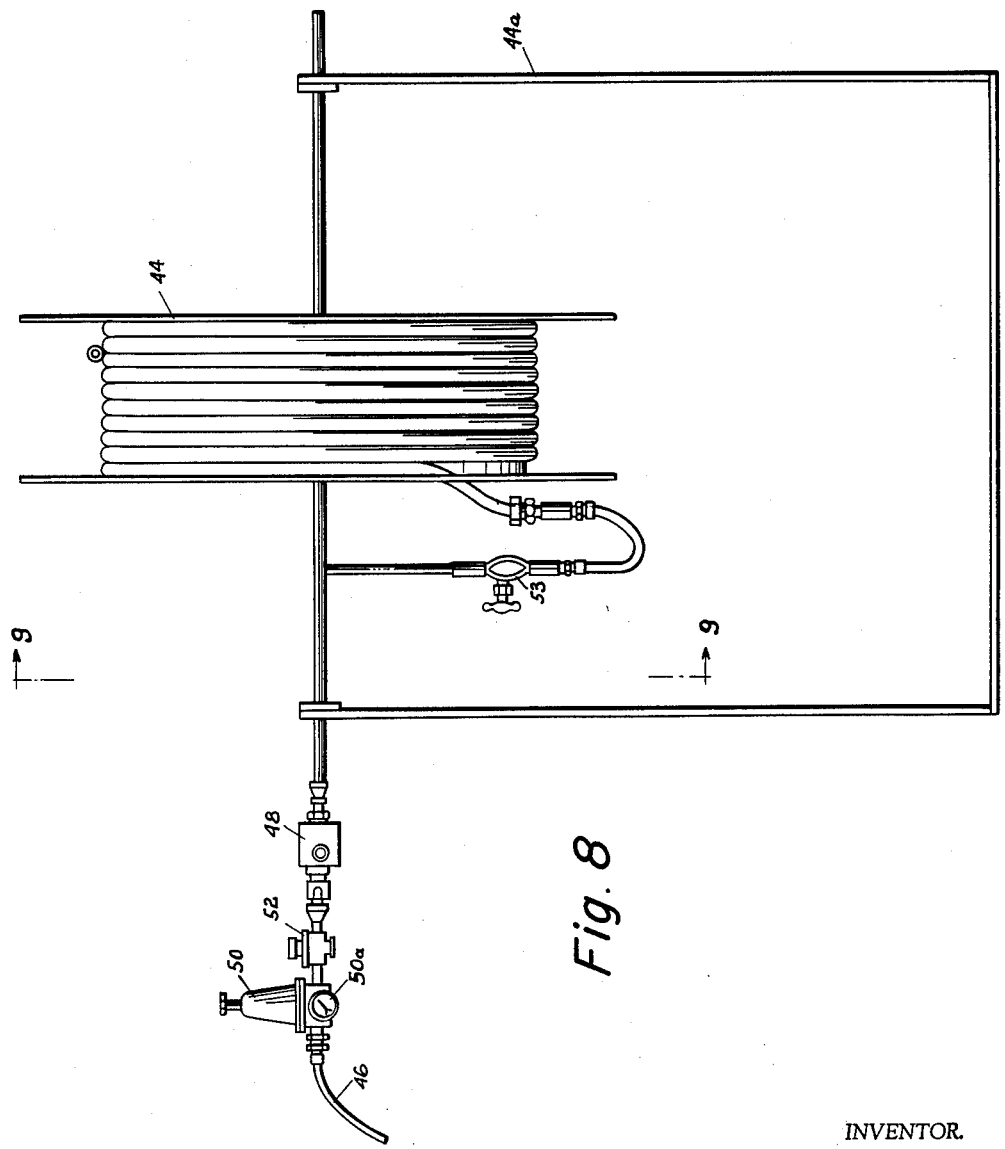
FIG. 8 is a front elevational view of a pay off reel or coil of the thin walled inner tubing as diagrammatically illustrated on the left hand end of FIG. 7, and the mechanism for maintaining an internal air pressure in such tubing during the application of the adhesive and subsequent braiding operation illustrated in FIG. 7.
Figure 9:
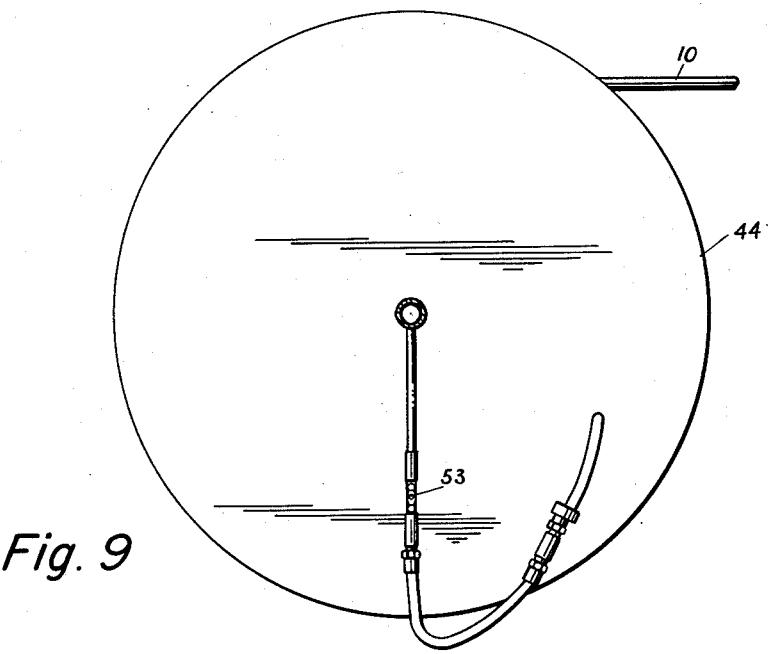
FIG. 9 is a side elevational view taken generally along the plane of line 9—9 of FIG. 8, looking in the direction of the arrows.

Referring now to FIG. 7, the reel 44 of tubing of thin walled inner tube 10 is connected up to an air supply for providing an internal air support to such coil of tubing during braiding thereof. This may be accomplished by the use of a pay-off stand 44a (FIG. 8), which supports the coil of tubing and which is connected as by means of piping 46 including a rotating pressure joint 48 to a supply of air, which supply of air is regulated by means of pressure regulator valve 50, which preferably includes an air pressure recording gauge 50a and an air pressure bleed-off valve 52. The rotating pressure joint 48 enables the pay-off reel 44 and air supply to rotate as the controls (e.g. 50) stay stationary. Control valve 53 may also be provided for readily holding the pressure in tubing 10.

Figure 10:
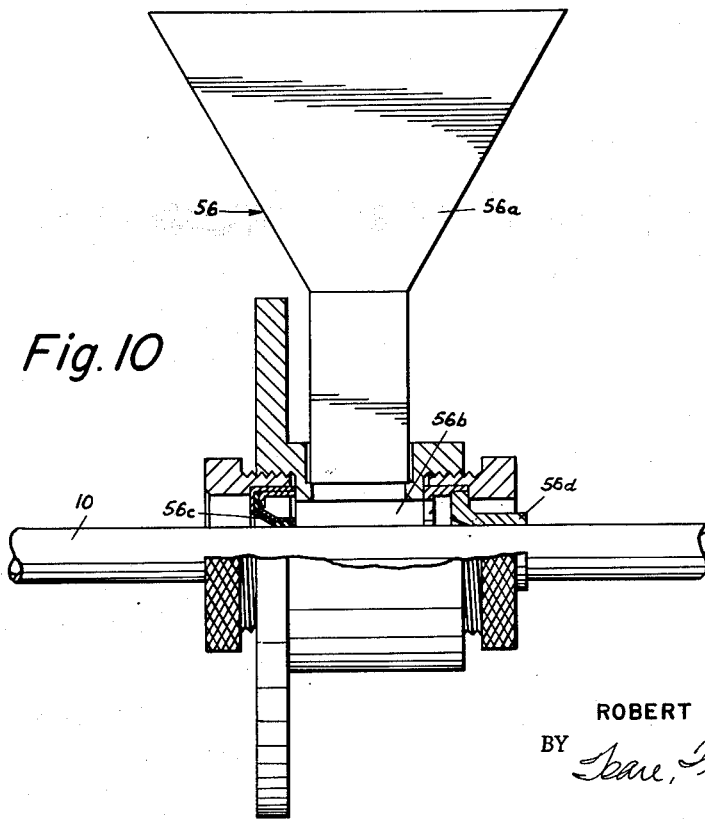
FIG. 10 is an enlarged, fragmentary, partially broken view of an adhesive applicator mechanism for applying adhesive to the thin walled inner tube prior to braiding, with such applicator mechanism being diagrammatically illustrated in FIG. 7.

The thin walled tube or core 10 is passed through a pre-heater 54 which heats the inner tubing before application of an adhesive thereto. The pre-heater may be energized by any suitable means, such as electric or gas heat, and is preferably provided with infra-red heating elements for heating the inner tube. From the pre-heater 54, the tubing passes through an adhesive applicator 56, which, as illustrated in FIG. 10, embodies a funnel portion 56a through which the adhesive is fed to the interior 56b of the applicator. The applicator is provided with resilient seal or doctor blade 56c at its forward end and a solid metal wiper collar 56d at its outlet end. This enables an effective very thin film of adhesive to be applied to the thin walled inner tube or core, which is provided with internal air pressure to maintain it against collapsing, irrespective of whether or not the external diameter of the tubing is maintained in exact conformance with predetermined size.

The tubing passes from adhesive applicator 56 to a drier mechanism 58 (FIG. 7) which, by the use of hot air, dries the film of adhesive material on the inner tube. This drier mechanism preferably is provided with a blower and associated heating element unit 58a for proper drying of the adhesive and driving off solvent found in the adhesive. This driving off of any solvent insures that no solvent will be trapped in the composite tubing structure upon application of the outer sheath, which solvent might cause poor adherence of the outer sheath, or of the braiding material to the inner tube, and thereby result in a defect in the reinforcing sleeve-like member or members 12 and 16 to the tubing product.

From the drier 58, the hot and adhesive coated inner tube may then be passed or moved to a further adhesive applicator 60 which may be of generally similar construction as that of applicator 56. From applicator 60, the inner tube is passed to a braiding mechanism 62, which may be of any conventional type, such as the "Wardwell" braider, or the "Textile" or "New England Butt" braiders. During passage of the inner tube from the adhesive applicator 60 to the braider 62, any solvent in the adhesive applied by applicator 60 evaporates from the inner tube due to the heated condition thereof, and thus insures that the application of the reinforcing braided material 14 to the inner tube is applied without the danger of solvent being trapped therein. If a second reinforcing layer of braided material (e.g. 16) is to be applied to the tubing, the latter is then preferably passed through another adhesive applicator 63 to apply film 17 thereon (FIG. 1) prior to passing through braider 64 for application of tubular member 16.

During the braiding operation, since the inner tube as such has a thin wall dimension and thus has practically no crush resistance, the aforementioned internal air support to the inner tube prevents the forces of the braiding material being applied to the tube from collapsing the tube. Moreover, since there is a desirability to maintain a specific internal diameter for the inner tube so as not to restrict the fluid flow through the predetermined diameter of hose, the inner tube or core is supported by means of the internal air pressure, so that the braid does not reduce the diameter of the inner core smaller than desired. Moreover, maintenance of the predetermnied internal diameter of the core is highly desirable so that the braids will be evenly laid upon the inner core, because it will be seen that to get the maximum burst pressure out of the tubing, the maximum number of braided strengthening materials are evenly laid, with each braid adjacent to the next braid, and if the diameter of the tubing is reduced, there will be a tendency for the braids to overlap and bunch up during the braiding operation.

The following are examples of internal air pressures utilized to support the adhesive coated inner tube during the aforementioned braiding operations:

On ⅜" I.D. tubing—60 lbs./sq. inch air pressure
On ½" I.D. tubing—94 lbs./sq. inch air pressure
On ¾" I.D. tubing—140 lbs./sq. inch air pressure If a second braided layer (i.e. 16) of material is added to the tubing, the air pressure may be increased somewhat for each of the subsequent braiding operations, since each braided layer of material may tend to crush the core to some extent, and thus the crushing pressure may increase as additional braids are added to the structure.

As aforementioned, in braiding the second layer of reinforcing material on the first layer of reinforcing material, a coating of solventized adhesive is applied to the first layer of braided material, the latter being hot due to the heated condition of inner tube 10 and thus driving off the solvent leaving the pressure sensitive adhesive only, and then the second reinforcing layer is braided in tensioned relation upon the first, resulting in bonding the first and second braided materials to one another, and with the first braided layer of material having previously been bonded to the core 10. As an example of temperatures utilized during the braiding operations, the pre-heater 54 may be maintained at 250° F., and the drier 58 temperature may be between 200–250° F.

Figure 11:
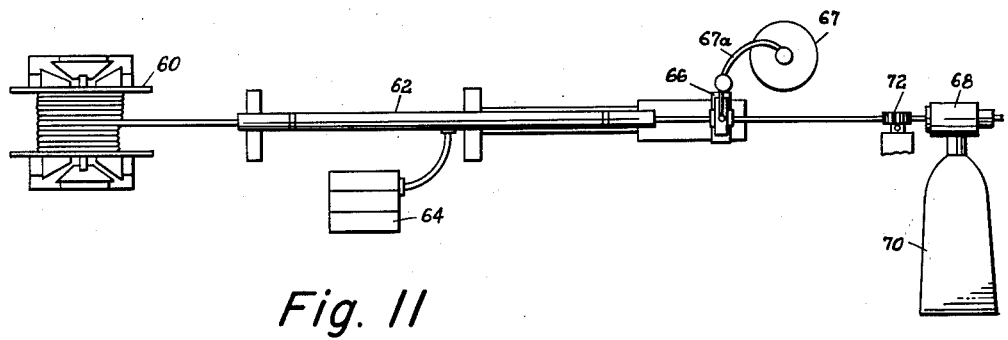
FIG. 11 is a more or less diagrammatic, top plan view of apparatus disposed in an organized system for taking the braided inner tube from a pay-off reel thereof, and extruding thereover the outer sheath material, to form the composite tubing product of the invention.
Figure 12:
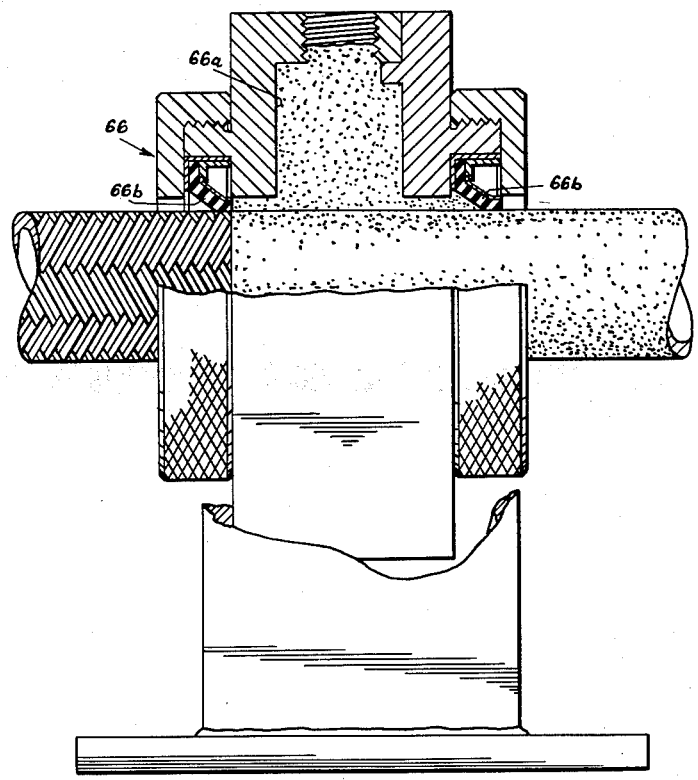
FIG. 12 is an enlarged, partially sectioned, detailed view of an adhesive applicator used in the apparatus illustrated in FIG. 11, to apply adhesive to the braided inner tube, prior to covering the same with the extruded outer sheath material.

After the core has been braided with one or more layers of braided material bonded to the core, it may be wound up upon a pay-off reel or stand 60, as shown in FIG. 11 of the drawings. From stand 60, the core and associated braided layers of strengthening material are passed to a tubular oven 62 which includes a heater and blower assembly 64 for passing hot air at a predetermined temperature over the braided material. Such predetermined temperature may be approximately 300° F. It is desirable to heat the reinforcing braid prior to the application of the adhesive layer which bonds the braided material to the outer sheath, so that the solvent in the subsequently applied adhesive layer will readily evaporate prior to the sheathing operation and will not be absorbed into the fibers of the braids.

From the oven 62, the braided core passes to a preferably pressurized adhesive applicator 66. Such pressurized applicator 66 has a chamber 66a therein filled with a quantity of the solventized adhesive material of the aforedescribed type and having wiper rings or wiper blades 66b at its entry and exit ends thereof for applying a thin and uniform coating of adhesive material to the braided inner tube or core. The adhesive is fed to the applicator by means of air pressure which may be in the form of a pressurized chamber 67 causing the adhesive to flow through a flexible tube 67a into the applicator at a predetermined pressure, and causing the adhesive to coat all of the intricacies of the outermost braid on the core. As aforementioned, the heated braids drive off and prevent any solvent and associated adhesive applied by the applicator 66 from being absorbed into the fibers of the braids to aid in maintaining the flexibility of the product.

A tension device 72 may be provided prior to entry of the braided and adhesive coated core into the extrusion head 68 of extruder 70, to maintain a straight braided tube during application of the outer sheath material. Such tension mechanism may comprise a pair of wheels, preferably grooved, which wheels are restricted in their rotative movement and through which the pulled adhesive coated, braided core passes. At extrusion head 68, the external sheath 21 of elastomeric material is applied to the adhesive coated braided core, and then as the finalized tubing product passes out of the cross head 68, it is cooled either by contact with the atmosphere or by passing it through a suitable cooling bath, whereupon it may be wound in coil form on reels or the like for shipment.

Once the process has been started it may be a substantially automatic process, wherein all of the aforedescribed apparatus could be set out in a continuous system for passage of the material forming component parts of the tubing from one apparatus to the next, and in a continually operating process for the automatic production of the tubing. It will be seen therefore, that even though the apparatus for producing the product has been illustrated and described in more or less sectional units, comprising first the production of the inner core, and then the production of the braided or reinforcing material bonded to the inner core, and then the production of the outer sheath material bonded to the braided reinforcing material of the tubing, that the process could be performed in one continuous straight line arrangement.

From the foregoing description and accompanying drawings, it will be seen that the invention provides a novel composite tubing product having greater flexibility as compared to prior art arrangements, and good crimp resistance characteristics, together with a novel apparatus for the production of such a product and a novel method of producing such a composite tubing product.

The terms and expressions which have been used are used as terms of description and not of limitation, and there is no intention in the use of such terms and expressions, of excluding any equivalents of any of the features shown or described, or portions thereof, but it is recognized that various modifications are possible within the scope of the invention claimed.

I claim:

1. A high strength composite tubing having improved flexibility, durability and crimp resistant characteristics under a wide range of temperature and pressure conditions comprising, a thin nylon inner tube having a wall thickness within the range of 0.010" to 0.025" with a tolerance of plus or minus 0.003", at least one layer of fibrous material disposed in braided relation about said inner tube and forming a reinforcing member therefor, adhesive means bonding said reinforcing member to said inner tube, an outer sheath of elastomeric polyurethane material having a wall thickness within the range of 0.010" to 0.040" with a tolerance of plus or minus 0.003" substantially covering said reinforcing member, and adhesive means intermediate said reinforcing member, and adhesive means intermediate said reinforcing member and said outer sheath bonding the latter together to form a unitary composite structure.

2. A high strength composite tubing in accordance with claim 1, wherein the fibrous braided reinforcing material is comprised of poly-(alkylene terephthalate) ester filaments.

3. A high strength composite tubing in accordance with claim 1, wherein said adhesive includes a rubber based, solventized pressure sensitive material.

4. A high strength composite tubing having improved flexibility, durability and crimp resistant characteristics under a wide range of temperature and pressure conditions, comprising, a thin extruded nylon inner tube having a wall thickness within the range of 0.010" to 0.025" with a tolerance of 0.003", a first layer of fibrous material disposed in braided relation about said inner tube, a second layer of fibrous material disposed in braided relation about said first mentioned layer of fibrous material and forming a reinforcing core about said inner tube, adhesive means bonding said braided reinforcing core to said inner tube, an outer sheath of elastomeric polyurethane material extruded onto said braided reinforcing core, said outer sheath completely covering said braided reinforcing core and having a wall thickness within the range of 0.01" to 0.04" with a tolerance of plus or minus 0.003", and adhesive means disposed intermediate said braided reinforcing core and said sheath bonding the latter together into a unitary composite structure.

5. A high strength composite tubing in accordance with claim 4, wherein the fibrous braided reinforcing core is comprised of poly-(alkylene terephthalate) ester filaments.

6. A high strength composite tubing in accordance with claim 4, wherein said adhesive means includes a rubber base, solventized pressure-sensitive material.

References Cited in the file of this patent

UNITED STATES PATENTS

| | | |
|---|---|---|
| 2,478,940 | Pape | Aug. 16, 1949 |
| 2,491,152 | Beidle | Dec. 13, 1949 |
| 2,512,433 | Leben | June 20, 1950 |
| 2,564,602 | Hurst | Aug. 14, 1951 |
| 2,690,769 | Brown | Oct. 5, 1954 |
| 2,766,164 | Salem | Oct. 9, 1956 |
| 2,879,803 | Francois | Mar. 31, 1959 |
| 2,918,394 | Smith | Dec. 22, 1959 |
| 3,062,241 | Brumbach | Nov. 6, 1962 |

FOREIGN PATENTS

| | | |
|---|---|---|
| 1,249,188 | France | Feb. 26, 1960 |

OTHER REFERENCES

"Urethane," by Arthur Larsen, Science Digest, February 1957, pages 75–78.